(12) United States Patent
Choi

(10) Patent No.: US 9,354,810 B2
(45) Date of Patent: May 31, 2016

(54) LETTER INPUT SYSTEM AND METHOD USING TOUCH PAD

(71) Applicant: Hyundai Motor Company, Seoul (KR)

(72) Inventor: Jin Young Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 48 days.

(21) Appl. No.: 14/530,157

(22) Filed: Oct. 31, 2014

(65) Prior Publication Data

US 2015/0160852 A1 Jun. 11, 2015

(30) Foreign Application Priority Data

Dec. 11, 2013 (KR) .......................... 10-2013-0153628

(51) Int. Cl.
*G06T 11/00* (2006.01)
*G06F 3/0488* (2013.01)

(52) U.S. Cl.
CPC .................................. *G06F 3/04883* (2013.01)

(58) Field of Classification Search
None
See application file for complete search history.

(56) References Cited

U.S. PATENT DOCUMENTS

| 2004/0066710 | A1* | 4/2004 | Yuen | G04G 21/06 368/73 |
| 2007/0152961 | A1* | 7/2007 | Dunton | G06F 3/017 345/156 |
| 2013/0050141 | A1* | 2/2013 | Park | G06F 3/0488 345/174 |

FOREIGN PATENT DOCUMENTS

| JP | 2011-192231 | 9/2011 |
| KR | 10-2008-0033739 | 4/2008 |
| KR | 10-2008-0065863 | 7/2008 |
| KR | 10-1032351 | 4/2011 |

* cited by examiner

*Primary Examiner* — Xiao Wu
*Assistant Examiner* — Mohammad H Akhavannik
(74) *Attorney, Agent, or Firm* — Mintz Levin Cohn Ferris Glovsky and Popeo, P.C.; Peter F. Corless

(57) ABSTRACT

A letter input system and method using a touch pad are provided to improve the function of inputting letters with an operation system within a vehicle. The system includes a touch pad that receives a writing from a user and a controller that recognizes a letter from the writing based on a transmission signal from the touch pad and outputs the recognized letter in a setting image on a display unit. The display unit displays the recognized letters in a predetermined section on the setting image based on a transmission signal from the controller.

24 Claims, 5 Drawing Sheets operation system touch pad section

LETTER INPUT SYSTEM AND METHOD USING TOUCH PAD

CROSS-REFERENCE TO RELATED APPLICATION

This application claims under 35 U.S.C. §119(a) the benefit of Korean Patent Application No. 10-2013-0153628 filed Dec. 11, 2013, the entire contents of which are incorporated herein by reference.

BACKGROUND (a) Technical Field

The present invention relates to a letter input system and a method using a touch pad, and more particularly, to a letter input system and a method using a touch pad within a vehicle for improving the function of inputting letters with an operation system disposed within a vehicle.

(b) Background Art

An audio video navigation (AVN) system, a system integrating an audio system, a multimedia device, and a navigation system etc., of a vehicle, are systems that integrate a multimedia system and a navigation system which are independently provided in the related art. In general, AVN systems are mounted at a front part of vehicles and have an operation system that includes various buttons and dials for operating audio and video systems, around a monitor on a center fascia. For example, in the related art, users engage buttons or turn a dial around the monitor of the AVN systems to set data and time displayed on the monitor. However, users have to repeatedly push the corresponding buttons with a finger to set desired date and time by increasing or decreasing numbers, when using buttons causing user inconvenience. In other words, multiple engagements of a button or multiple turns of a dial are required to accomplish the desired task.

Further, for example, drivers use a corresponding button of a dial to change the radio frequency, but the drivers have to change the frequency by adjusting the amount of rotation while looking at the rotating dial, when using a dial, causing user inconvenience. Therefore, selection of a frequency and precise turning of the dial in both directions around the desired frequency to set an accurate frequency may be difficult.

The above information disclosed in this section is merely for enhancement of understanding of the background of the invention and therefore it may contain information that does not form the prior art that is already known in this country to a person of ordinary skill in the art.

SUMMARY

The present invention provides a letter input system and method using a touch pad within a vehicle which may improve the functions of inputting and editing letters and convenience for a user, using an integrated operation system that can recognize writing of a user. The input of letters may be used to, for example, edit the time and other data displayed on a vehicle monitor.

An exemplary embodiment of the present invention provides a letter input system using a touch pad that may include: a touch pad configured to receive writing (e.g., an input) from a user; a controller configured to recognize a letter written by a user based on a transmission signal from the touch pad and output the recognized letter in a setting image on a display unit; and the display unit may be configured to display the letters recognized by the controller in a predetermined section on the setting image based on a transmission signal from the controller.

The setting image on the display unit may be displayed on the display unit, when an AVN system enters a setting state for setting date and time or displayed on the display unit, when an AVN system enters a setting state for changing a radio channel and may include a predetermined section for displaying letters recognized by the controller. The controller may be configured to recognize a date section and a time section in the setting image on the display unit as individual display sections, respectively, and may be configured to automatically move a default focus waiting input by a user to the other section, when the user finishes inputting in any one of the date section and the time section. For example, the controller may be configured to automatically move the default focus waiting input by a user to the time section, when the user finishes inputting in the date section.

Further, according to an exemplary embodiment of the present invention, the controller may be configured to recognize each of the year, month, and day in the date section as one respective display section on the setting image of the display unit, and when a user presses the dial (e.g., presses the dial after having rotated the dial) while writing input on the month section of the day section, the controller may be configured to determine that a user has completed inputting on the display section and may be configured to move the default focus to the next display section. More specifically, the controller may be configured to recognize each of the year, month, and day in the date section as one respective display section on the setting image, and when a user inputs one digit and then presses the dial with the default focus on the month section or the day section, the controller may be configured to recognize the input as a two-digit writing by adding '0' before the single digit and may be configured to move the default focus to the next display section on the setting image.

The controller may be configured to determine that a user has completed writing and inputting, when a dial is pushed after a letter written and input on the touch pad by a user is recognized. The controller may also be configured to determine that a user finishes writing and inputting and may be configured to activate a radio channel input by the user, when a dial is pushed after a letter written and input on the touch pad by a user is recognized. The controller may be configured to output a letter written and input on the touch pad by a user through a voice upon recognizing the letter, delete one letter recognized (e.g., the last input letter), from a predetermined section in the setting image on the display unit, in response to recognizing the input of a deleting sign, and delete all of the letters recognized until the input and hold are recognized, from a predetermined section in the setting image on the display unit, in response to recognizing an input and hold of a deleting sign. In other words, the controller may be configured to either delete a last input letter, a complete input, or the like based on a user command/input.

Another exemplary embodiment of the present invention provides a letter input method that may include: receiving writing input on a touch pad by a user; recognizing the writing input as a letter; outputting recognized the letter, in a setting image on a display unit; sequentially displaying letters in a predetermined section in the setting image on the display unit by repeating the receiving, recognizing, and outputting processes.

In the process of sequentially displaying letters, after letters are sequentially displayed in a predetermined section in the setting image on the display unit and a user finishes writing and inputting, a radio channel may be activated based on the writing and inputting by the user by pushing a dial. A letter written and input on the touch pad by a user may be output through a voice (e.g., via a speaker), when the letter is recognized. When input of a deleting sign is recognized, one letter recognized right before the input, may be deleted from a predetermined section in the setting image on the display unit. When input and hold of a deleting sign is recognized, all letters recognized until the input and hold of the deleting signal is recognized, may be deleted from a predetermined section in the setting image on the display unit.

According to the letter input system and method of the present invention, since a user may directly input letters and signs in a contact type, using a touch pad, operation of an AVN system using an operation system may be simplified, the functions of inputting and editing letters may be improved, and operability and convenience for a user may be increased. In particular, it may be possible to set date and time without using the existing operation systems such as buttons or dials, and to activate a radio frequency by a particular radio frequency being directly input to the touch pad, when changing and selecting the radio channel.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
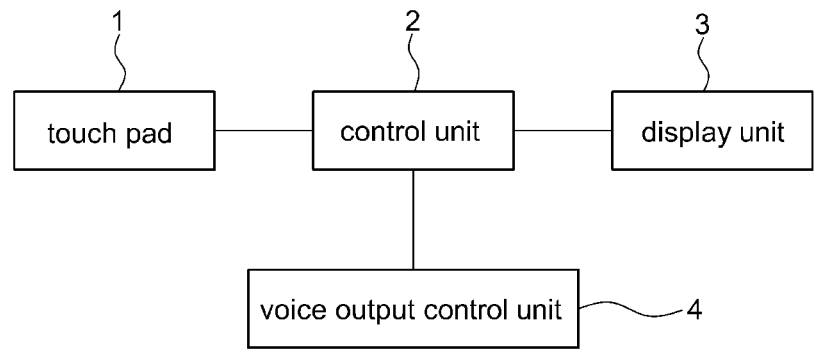
FIG. 1 is an exemplary view showing a letter input system using a touch pad in a vehicle according to an exemplary embodiment of the present invention.

1: touch pad
2: controller
3: display unit
4: voice output controller

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

Hereinafter, the present invention will be described such that those skilled in the art can easily achieve it.

The present invention has been made to improve operability of an AVN system and improve operability and convenience for users by improving operational limits when using operation systems such as buttons or dials. Accordingly, exemplary embodiments of the present invention set date and time by outputting letters, directly input to the operation system of an AVN system by passengers, including a driver in a vehicle, on a monitor, or activate the radio channel that corresponds to a letter simultaneously with outputting the letter on a monitor.

Figure 2:
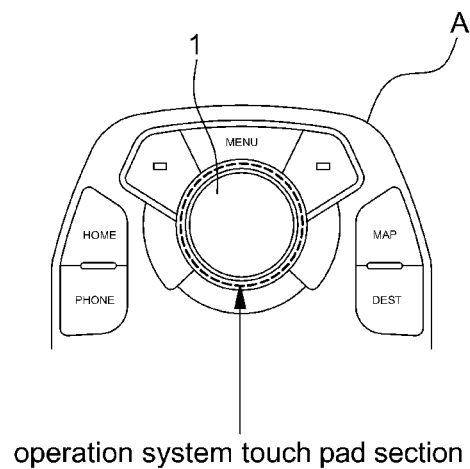
FIG. 2 is an exemplary view showing a touch pad area of a letter input system using a touch pad in a vehicle according to an exemplary embodiment of the present invention.

As shown in FIG. 1, a letter input system using a touch pad in a vehicle according to the present invention may include a touch pad 1, a controller 2, and a display unit 3. In particular, the touch pad 1, may be configured to receive letters written directly by a user, generate and transmit a touch signal to the controller 2, in response to a letter input, and may be integrally disposed on the surface of a dial within an AVN operation system (operation system for an AVN system) A, as shown in FIG. 2.

The controller 2, which may be configured to operate the components to perform the operation of corresponding functions based on signals from the touch panel 1, may be configured to recognize writing input by a user in response to a touch signal from the touch pad 1 as a letter and generate and transmit a control signal to the display unit 3 to output the recognized letter on the display unit 3. The display unit 3 may be configured to receive the control signal and output and display the letter recognized by the controller 2, in a predetermined section on a setting image (e.g., a date section or a time section in a date and time setting image) based on an instruction (e.g., a control signal or command) from the controller 2. For example, an AVN monitor may be used as the display unit 3. A letter input method according to the present invention is described hereafter with reference to FIGS. 3 and 4.

Figure 3:
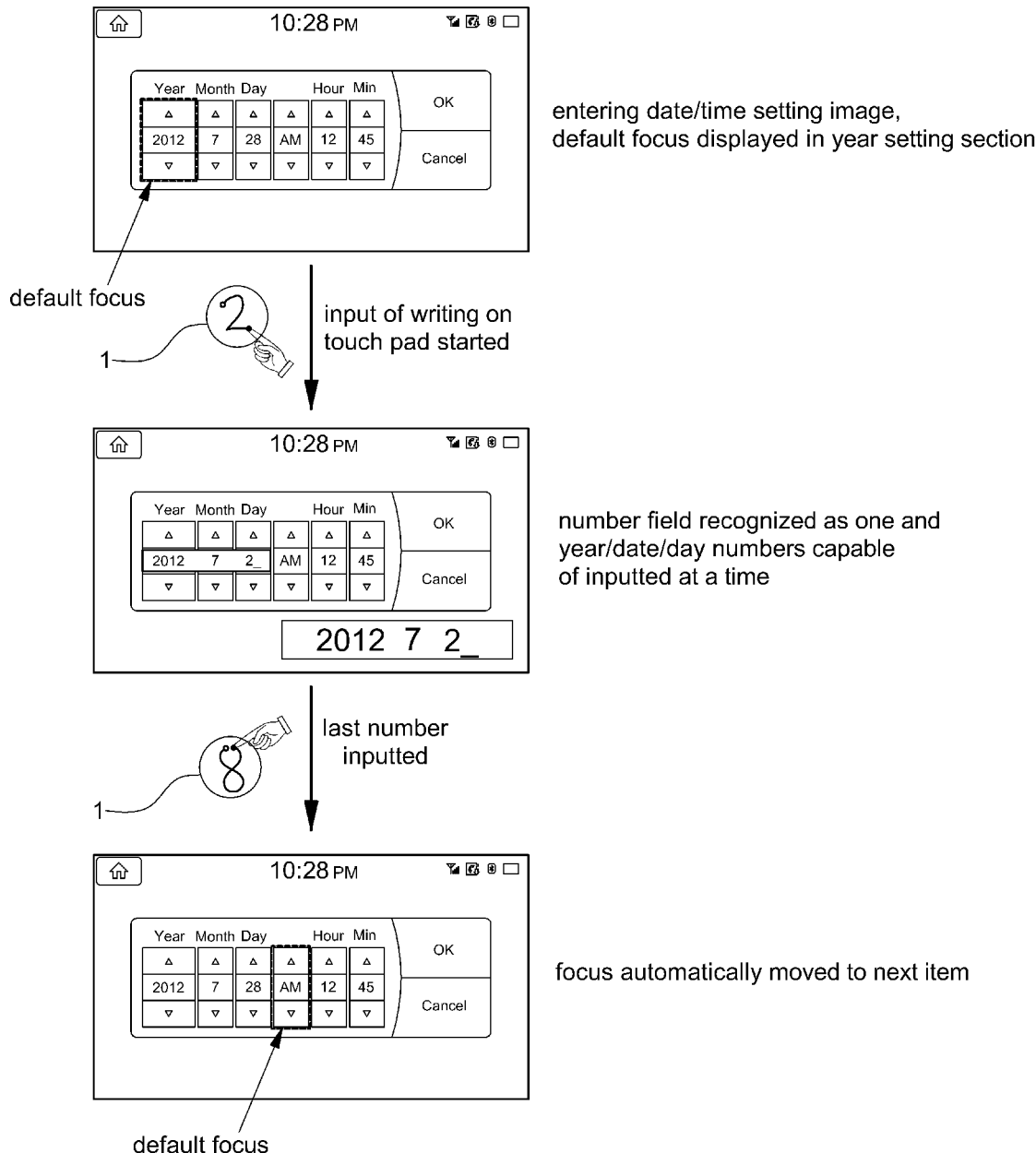
FIG. 3 is an exemplary view of changing date and time displayed on a display, using the letter input system using a touch pad in a vehicle according to an exemplary embodiment of the present invention.

FIG. 3 schematically shows an example of setting date and time to be displayed on the display unit 3, using the letter input system according to the present invention. Referring to FIG. 3, when an AVN system enters a setting state for setting date and time in accordance with operation by a user, a setting image for setting date and time may be displayed on the display unit 3 and a default focus waiting input from a user may also be displayed in the date section.

The controller 2 may be configured to automatically convert the touch pad 1 into an interface for writing input and recognize the input upon start of writing input on the touch pad 1 by the user after the default focus is displayed in the date section. When the user inputs writing on the touch pad 1 with the default focus displayed in the date section, the touch pad 1 may be configured to generate and transmit a touch signal that corresponds to the letter written by the user and the controller 2 may be configured to recognize the writing input by the user as a letter in response to the received touch signal.

The controller 2 may be configured to recognize the date section showing the year, month, and day as one display section and sequentially determine the writing input by the user as year, month, and day based on the input order to display the letters corresponding to the sequential writing input of the user as the year, month, and day sections of the date section. When the user writes the last letter to be output in the date section, on the touch pad 1, the controller 2 may be configured to determine that the user finishes inputting in the date section (e.g., that the date input is complete), and automatically move the default focus to the next section (or item), that is, the time section.

Further, the controller 2 may be configured to recognize the time section showing a.m./p.m., hour, and minute as one display section and sequentially determine the writing input by the user as a.m. or p.m., hour, and minute based on the input order to display the numbers or letters in the a.m./p.m., hour, and minute sections of the time section. When the user writes and inputs the last letter to be output in the time section, on the touch pad 1, the controller 2 may be configured to determine that the user finishes inputting in the time section (e.g., the time section input is complete or the time entry is complete), and may be configured to terminate the input by the user or automatically move the default focus to the next section (or item), that is, the date section. In other words, the controller 2 may be configured to determine that the user finishes inputting for a predetermined section, when the last one of the letters input in the predetermined section of the setting image on the display unit 3 is input. For example, when a user writes the last eighth letter of a total eight letters input in the date section, the default focus on the setting image may automatically move to the time section.

In the date section, the year may be shown by four digits and the month and the date may be shown by two digits, so when '201411' is input instead of '20140101' to input 'Jan. 1, 2014', the controller may not recognize that the user has completed the date entry. Accordingly, when the user presses the dial while writing input, the controller may be configured to determine the input as the year, month, and day in the date section and display them. In particular, the controller 2 may be configured to recognize each of the year, month, and day in the date section as one display section and sequentially display the writing input by the user based on the input order (e.g., the sequence in which the letters or numbers were input). Accordingly, when the user presses the dial while writing input, the controller 2 may be configured to determine that input on one section is complete, and move the default focus on the setting image to the next display section.

When the letters that correspond to the number of digits of the year, month, and day sections are written (e.g., input), the default focus on the setting image may automatically move to the next display section. For example, to input 'Jan. 1, 2014', when a user inputs '2014' on the touch pad 1, the default focus may automatically move to the month section from the year section, and then when the user inputs '01', the default focus may automatically move to the day section from the moth section. Further, when the user inputs '1' instead of '01' on the moth section and then presses the dial, the controller 2 may be configured to recognize the input as '01' by adding '0' before '1' and move the default focus to the day section. In other words, the controller 2 may be configured to recognize each of the year, month, and day in the date section as one respective display section on the setting image of the display unit 3. Further, when a user inputs one digit and then presses the dial with the default focus on the month section or the day section, the controller 2 may be configured to recognize the input as a two-digit writing by adding '0' before the single digit and move the default focus to the next display section on the setting image.

Figure 4:
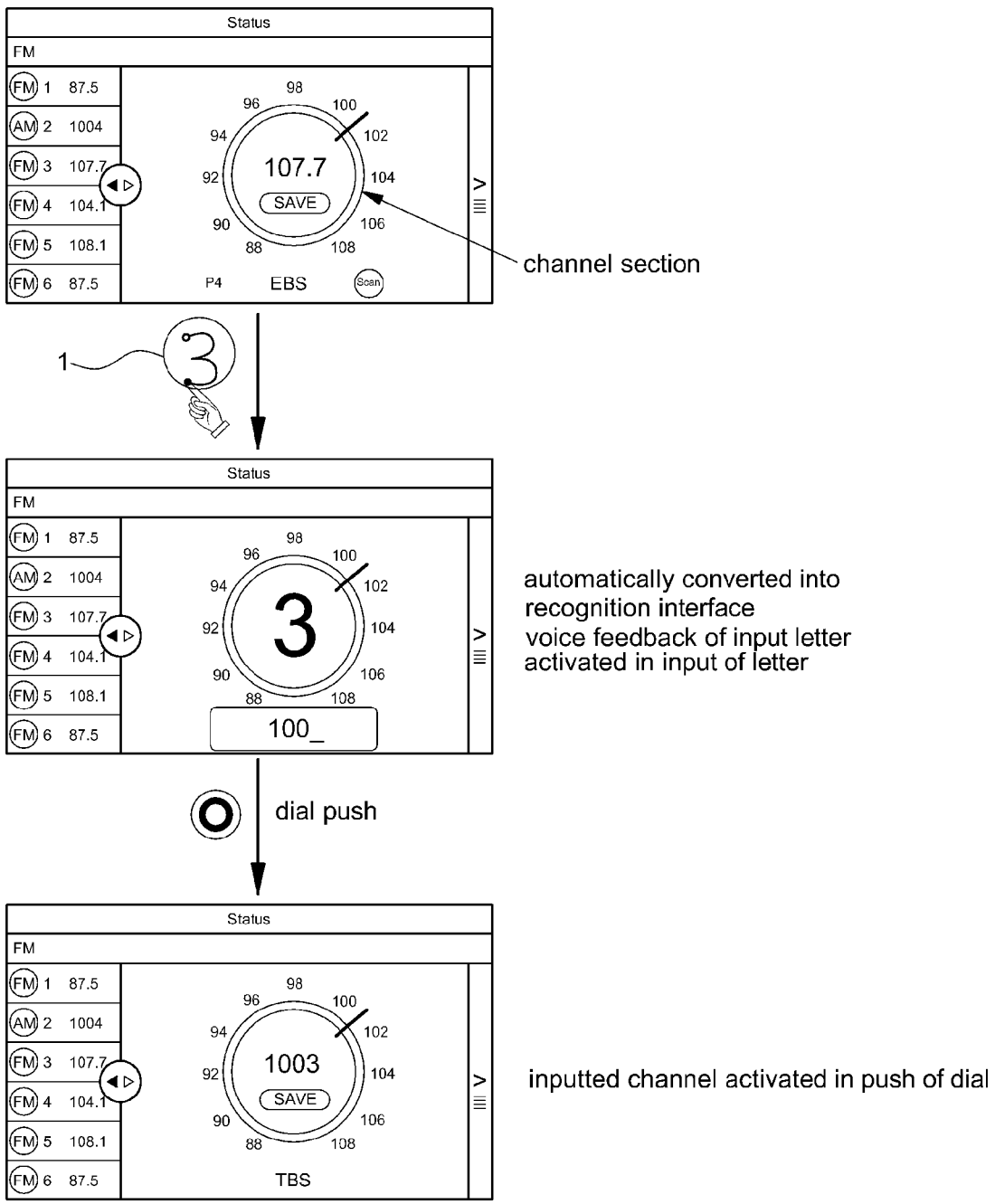
FIG. 4 is an exemplary view of changing a radio channel, using the letter input system according to an exemplary embodiment of the present invention.

FIG. 4 schematically shows an example of changing and activating a radio channel (frequency), using the letter input system according to an exemplary embodiment of the present invention the present invention. Referring to FIG. 4, when the AVN system is operated by a user and enters a setting state for changing and selecting a radio channel, a setting image for changing a radio channel may be displayed on the display unit 3. A channel section showing the current set radio channel may be displayed in the setting image on the display unit 3. The controller 2 may be configured to automatically convert the touch pad 1 into an interface for writing input and recognize the input upon start of writing input on the touch pad 2 by the user after the display unit 3 displays the setting image for changing and selecting a radio channel.

The touch panel 1 may be configured to generate and transmit a touch signal that corresponds to the letter or number written (e.g., input) by the user and the controller 2 may be configured to recognize the writing input by the user as a letter or number in response to the received touch signal. Further, the controller 2 may be configured to notify the user of the letter via speakers without requiring the user to view the setting image by outputting a sound of the letter recognized by the input of the writing by the user. For this voice feedback, the controller 2 may be configured to operate a voice output unit (e.g., the speaker of an audio system) within a vehicle, in cooperation with a voice output controller 4 to operate the voice output unit. In other words, when recognizing writing input by the user, the controller 2 may be configured to operate the voice output unit such as a speaker to output a voice or sound for the letter that corresponds to the recognized writing.

Further, the controller 2 may be configured to display the writing input by the user in the channel section on the display unit 3 upon recognizing the input and sequentially display the letters input by the user of the letters showing the radio channel. For example, when the letters showing a radio channel are four digits and a user writes and inputs sequentially 1, 0, 0, and 3, a radio channel may be displayed in the channel section on the display unit in the order or '1'->'10'->'100'->'1003'. When the user pushes a dial (e.g., dial of an operation system with the touch pad 1) after writing the last one of the letters showing the radio channel sequentially written and input on the touch pad 1, the controller 2 may be configured to determine that the user finishes inputting in the channel section, and may be configured to activate the radio channel input by the user to allow the user to listen to the broadcasting.

As described above, according to the letter input system of the present invention, it may be possible to listen to a desired radio broadcasting without turning a dial of an operation system, by directly writing and inputting a radio channel (e.g., frequency) on the touch pad 1. Further, input for deleting written letters may be possible in addition to input of writing by a user who directly inputs desired letters on the touch pad 1.

Figure 5A:
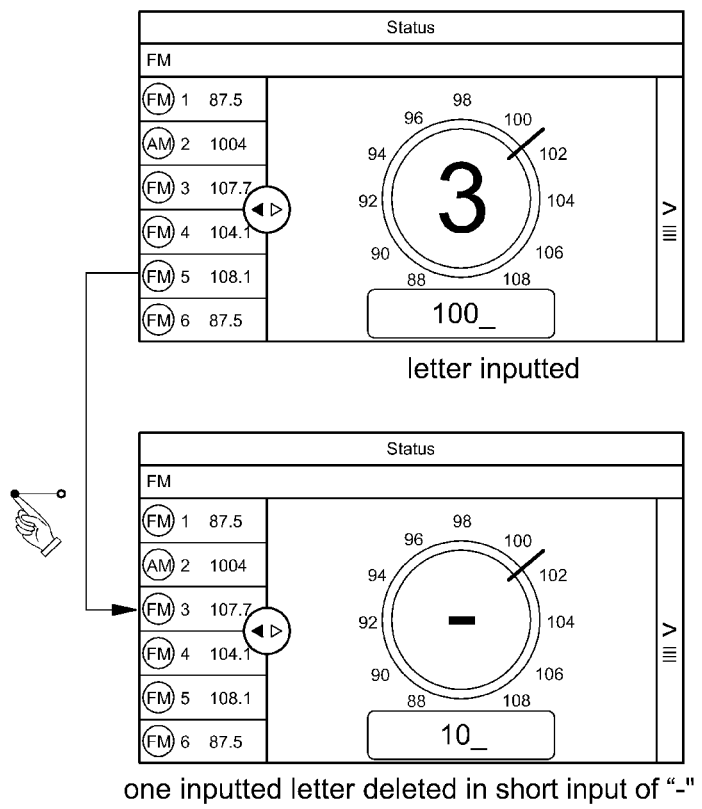
FIGS. 5A and 5B are exemplary views of deleting writing input on the touch pad, when changing a radio channel with the letter input system according to an exemplary embodiment of the present invention.
Figure 5B:
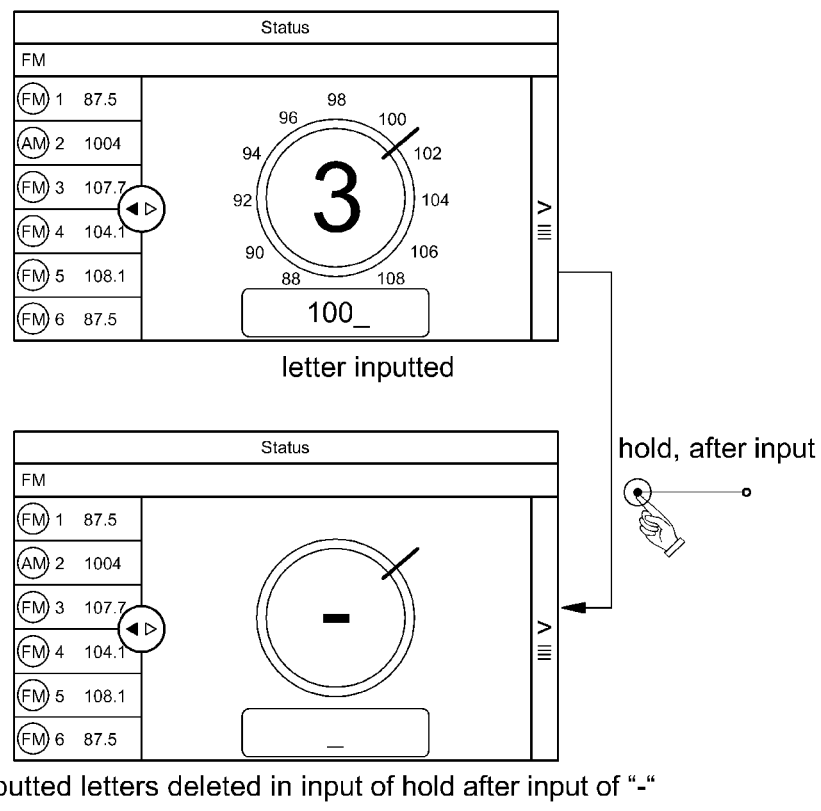

FIGS. 5A and 5B are views schematically showing an example of deleting writing input on the touch pad 1 and output on the display unit 3, when changing a radio channel with the letter input system according to an exemplary embodiment of the present invention. Referring to FIGS. 5A and 5B, when a user writes and inputs a predetermined deleting sign, the touch pad 1 may be configured to generate and transmit a touch signal that corresponds to the deleting sign written by the user to the controller 2 and the controller 2 may be configured to recognize the writing inputted by the user as a deleting sign (letter) in response to the touch signal.

When recognizing the input of the deleting sign, the controller 2 may be configured to delete one letter input and recognized right before the input of the deleting sign (e.g., the last input prior to the deleting sign). Further, when a user holds an input without finger (e.g., contact mean) off the touch pad 1 and with the finger in contact with it after inputting a deleting sign, the controller 2 may be configured to delete all of the letters input and recognized right before the deleting sign (e.g., all of the letters showing the radio channel or all of the letters showing date or time, that is, a complete entry). In other words, when recognizing holding after input of the deleting sign, the controller 2 may be configured to delete all of the letters received right before the deleting sign and displayed in the channel section in the setting image on the display unit 3. Deleting one or all of the letters in response to input of a deleting sign may also be possible when a user writes and inputs a letter to set date and time.

As described above, the letter input system of an AVN operation system according to the present invention may improve the functions of inputting and editing letters of an operation system using the touch pad 1, such that operability of the AVN system and convenience for a user may be improved.

Although exemplary embodiments of the present invention were described in detail above, the scope of the present invention is not limited thereto and various changes and modifications from the spirit of the present invention defined in the following claims by those skilled in the art are also included in the scope of the present invention. The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A letter input system using a touch pad, comprising:
a touch pad configured to receive a writing from a user; and
a controller configured to recognize a letter from the writing based on a transmission signal from the touch pad and output the recognized letter in a setting image on a display unit,
wherein the display unit is configured to display the letters recognized by the controller in a predetermined section in the setting image based on a transmission signal from the controller, and
wherein the controller is configured to recognize a date section and a time section in the setting image on the display unit as individual display sections, respectively, and automatically move a default focus waiting input by a user to the time section, when the user finishes inputting in the date section.

2. The system of claim 1, wherein the setting image on the display unit is displayed on the display unit, when an AVN system enters a setting state for setting date and time, and includes a predetermined section for displaying letters recognized by the controller.

3. The system of claim 1, wherein the setting image on the display unit is displayed on the display unit, when an AVN system enters a setting state for changing a radio channel, and includes a predetermined section for displaying letters recognized by the controller.

4. The system of claim 1, wherein the touch pad is disposed on a surface of a dial within an operation system for an AVN system.

5. The system of claim 1, wherein the controller is configured to recognize a date section and a time section in the setting image on the display unit as individual display sections, respectively, and automatically move a default focus waiting input by a user to the other section, when the user finishes inputting in any one of the date section and the time section.

6. The system of claim 1, wherein the controller is configured to determine a complete input when a dial is pushed after a letter written and input on the touch pad is recognized.

7. The system of claim 1, wherein the controller is configured to determine a complete entry and activate a radio channel input by the user, when a dial is pushed after a letter written and inputted on the touch pad is recognized.

8. The system of claim 1, wherein the controller is configured to output a letter written and input on the touch pad via a speaker upon recognizing the letter.

9. The system of claim 1, wherein when recognizing input of a deleting sign, the controller is configured to delete one letter recognized prior to the deleting sign input, from a predetermined section in the setting image on the display unit.

10. The system of claim 1, wherein the controller is configured to delete a complete entry of letters recognized until the input and hold are recognized, from a predetermined section in the setting image on the display unit when recognizing input and hold of a deleting sign.

11. A letter input method using a touch pad, comprising:
receiving, by a controller, a writing input on a touch pad by a user;
recognizing, by the controller, the input writing inputted as a letter;
outputting, by the controller, the recognized letter recognized in a setting image on a display unit; and
recognizing, by the controller, a date section and a time section in the setting image on the display unit as individual display sections, respectively, and automatically moving a default focus waiting input by a user to the time section, when the user finishes inputting in the date section.

12. The method of claim 11, further comprising:
sequentially displaying, by the controller, letters in a predetermined section in the setting image on the display unit by repeating the receiving, recognizing, and outputting processes.

13. The method of claim 12, wherein the setting image on the display unit is displayed on the display unit, when an AVN system enters a setting state for setting date and time, and includes a predetermined section for displaying the recognized letter.

14. The method of claim 12, wherein the setting image on the display unit is displayed on the display unit, when an AVN system enters a setting state for changing a radio channel, and includes a predetermined section for displaying the recognized letter.

15. The method of claim 12, wherein in the displaying process, after letters are sequentially displayed in a predetermined section in the setting image on the display unit and an input is complete, a radio channel is activated, by the controller, based on the writing and inputting by pushing a dial.

16. The method of claim 12, wherein when input of a deleting sign is recognized, one letter recognized before the deleting sign input, is deleted, by the controller, from a predetermined section in the setting image on the display unit.

17. The method of claim 12, wherein when input and hold of a deleting sign is recognized, a complete input of letters recognized until the input and hold of the deleting signal is recognized, are deleted, by the controller, from a predetermined section in the setting image on the display unit.

18. The method of claim 12, wherein the controller is configured to recognize each of the year, month, and day in the date section as one display section on the setting image of the display unit, and when the dial is pressed while an input regarding the month section of the day section is being input, the controller is configured to determine a complete input on the display section and move the default focus to the next display section.

19. The method of claim 12, wherein the controller is configured to recognize each of the year, month, and day in the date section as one display section on the setting image of the display unit, and when one digit is input and the dial is pressed with the default focus on the month section or the day section, the controller is configured to recognize the input as a two-digit writing by adding a zero before the one digit and move the default focus to the next display section on the setting image.

20. The method of claim 11, wherein the touch pad is disposed on a surface of a dial within an operation system for an AVN system.

21. The method of claim 11, wherein a letter written and input on the touch pad is output via a speaker, when the letter is recognized.

22. The method of claim 11, wherein when input of a deleting sign is recognized, by the controller, one letter recognized before the deleting sign input, is deleted from a predetermined section in the setting image on the display unit.

23. A non-transitory computer readable medium containing program instructions executed by a controller, the computer readable medium comprising:
program instructions that receive a writing input on a touch pad by a user;
program instructions that recognize the input writing inputted as a letter;
program instructions that output the recognized letter recognized in a setting image on a display unit; and
program instructions that recognize a date section and a time section in the setting image on the display unit as individual display sections, respectively, and automatically move a default focus waiting input by a user to the time section, when the user finishes inputting in the date section.

24. The non-transitory computer readable medium of claim 23, further comprising:
program instructions that sequentially display letters in a predetermined section in the setting image on the display unit by repeating the receiving, recognizing, and outputting processes.

* * * * *